United States Patent [19]

Escaravage et al.

[11] Patent Number: 4,871,192
[45] Date of Patent: Oct. 3, 1989

[54] RETENTION MECHANISM FOR A SAFETY-BELT BAND OF MANUALLY ADJUSTABLE POSITION

[75] Inventors: Gérard Escaravage, Valentigney; Michel Henriot, Ecurcey, both of France

[73] Assignee: ECIA-Equipements Et Composants Pour L'Industrie Automobile, Audincourt, France

[21] Appl. No.: 254,644

[22] Filed: Oct. 7, 1988

[30] Foreign Application Priority Data

Oct. 7, 1987 [FR] France ................................. 87 13865

[51] Int. Cl.⁴ .......................................... B60R 22/20
[52] U.S. Cl. .................................... 280/808; 280/801
[58] Field of Search ............................ 280/808, 801; 248/297.3; 297/468, 483; 403/329, 325

[56] References Cited

U.S. PATENT DOCUMENTS 4,786,081  11/1988  Schmidt ............................. 280/808

FOREIGN PATENT DOCUMENTS 2460092  6/1976  Fed. Rep. of Germany ...... 280/808
3338645  5/1985  Fed. Rep. of Germany .
3543813  6/1986  Fed. Rep. of Germany ...... 280/808
2261023  9/1975  France ................................. 297/483
1367248  9/1974  United Kingdom ................ 297/483

Primary Examiner—Kenneth R. Rice
Assistant Examiner—Karin Tyson
Attorney, Agent, or Firm—Sughrue, Mion, Zinn, Macpeak & Seas

[57] ABSTRACT

The mechanism intended to be fastened to a structure (10) is composed of a body (20), a guide (30), a spring (40) and a band support (50).

The guide is equipped with cells (312) with stays (313) where a reinforcement (53) of the support (50) can rest. In order to shift the support, the reinforcement is freed from a cell counter to the force of the spring and is made to slide along the base of the rear of the latter.

The invention is used for motor-vehicle safety belts.

9 Claims, 2 Drawing Sheets

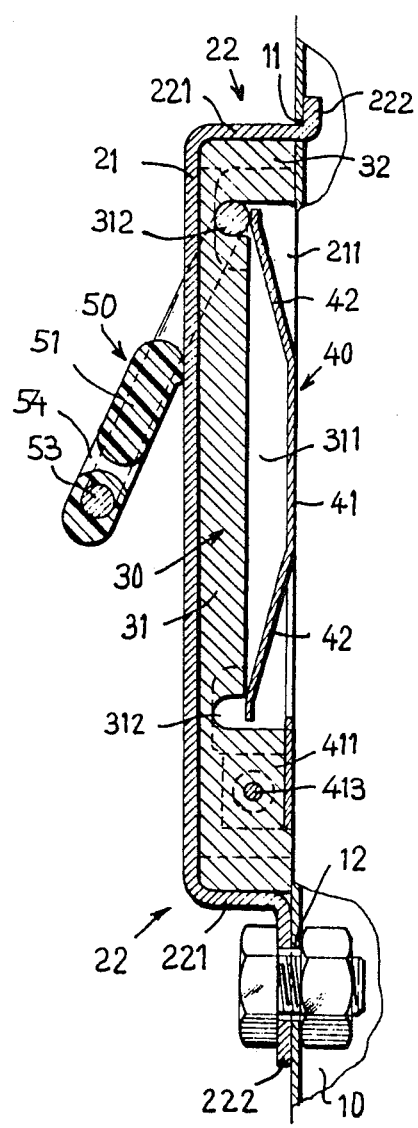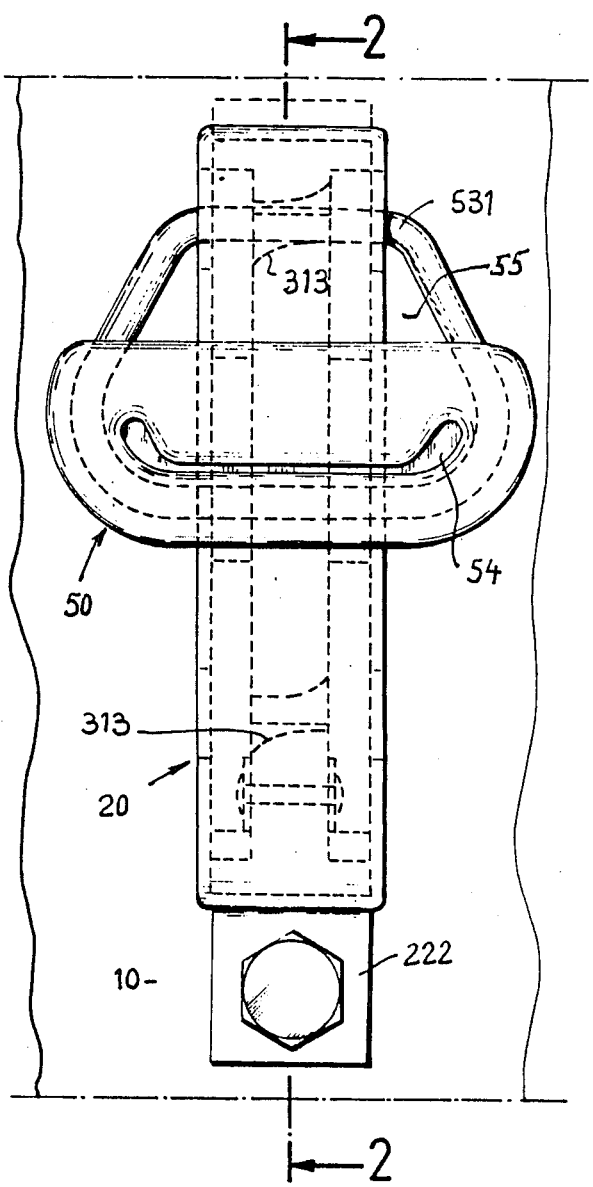

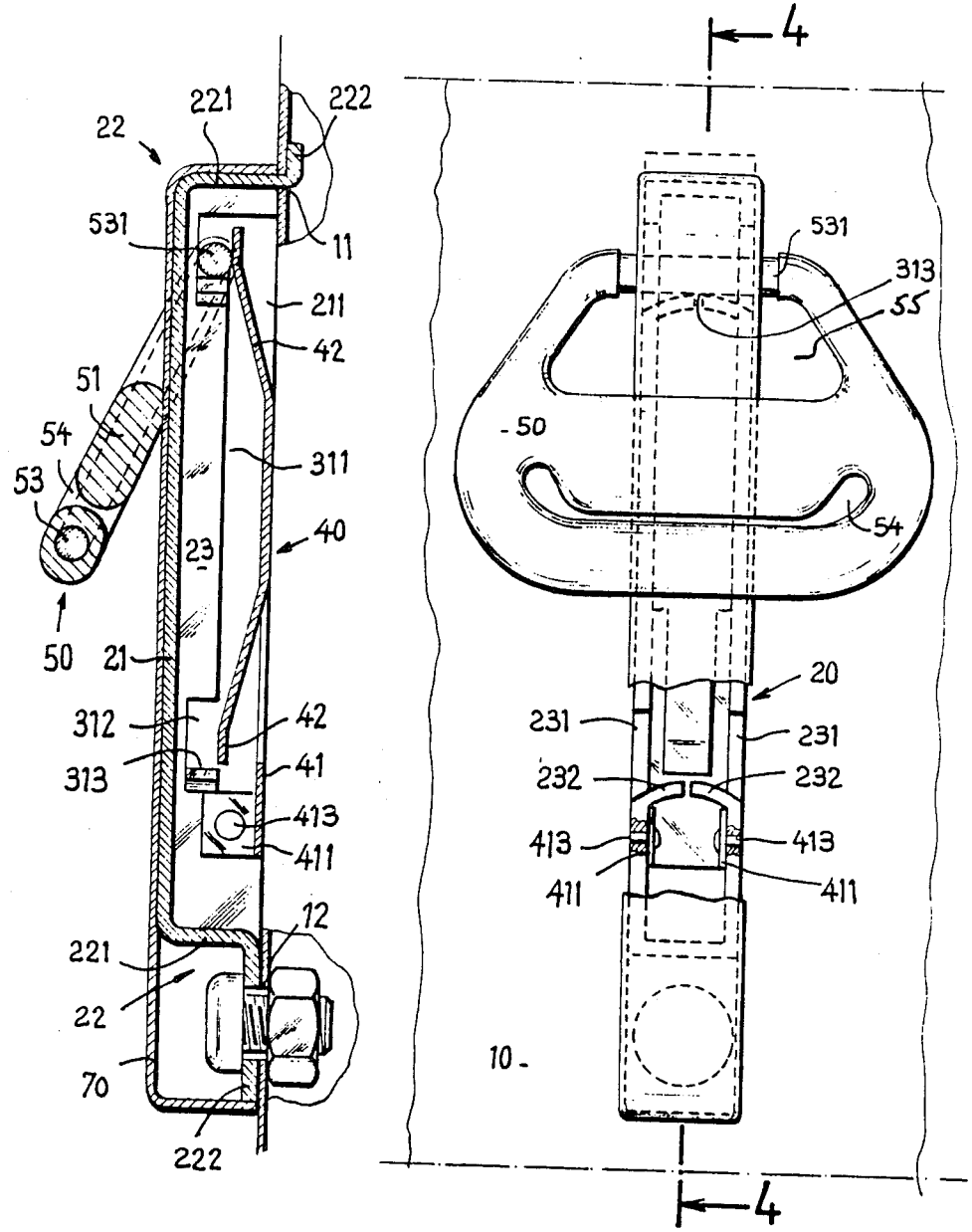

RETENTION MECHANISM FOR A SAFETY-BELT BAND OF MANUALLY ADJUSTABLE POSITION

The present invention relates to safety belts for a passenger transport vehicle, especially a land vehicle, and its subject is, more particularly, a retention mechanism which is provided for a safety-belt band of manually adjustable position and which is intended to be fastened to a structure.

As is known, for safety reasons, passenger transport vehicles are conventionally provided with seats equipped with safety belts. This applies, for example, to aircraft and motor vehicles.

Where motor vehicles are concerned, safety-belts with two or three anchoring points are conventionally used. When the safety belt with three anchoring points is employed, the band comprises a pelvic strand and a pectoral strand which passes across the wearer's chest in the manner of a shoulder belt.

When a safety belt of this latter type is used, the pectoral strand occupies a postion relative to its wearer which depends both on his or her build, the geometry of the vehicle and the seat and also on the state of fatigue of the latter. Under these conditions, in some cases the pectoral strand can be level with the wearer's neck. It will therefore be appreciated that, in the event of a violent collison, whilst the safety-belt is immobilized under the control of the inertia detector, the passenger's body is thrown violently forwards and his neck encounters the band which can then behave no longer as a safety means, but as an especially dangerous object. In fact, in some collisions, it has been possible to find serious lesions of the neck caused by the safety belt and more particularly, its pectoral strand.

Consequently, there have already been proposals to ensure that the upper fastening point of the pectoral strand is of adjustable position, in order to take into account the wearer's build in comparison with the configuration of the vehicle.

Various devices have already been proposed. They are very often of a configuration which is such that the upper fastening point of the pectoral strand can occupy many positions within a range, the extent of which allows for the extreme builds of a population in comparison with its average build.

These devices, which are sometimes motorized, are of very great complexity. They frequently resort to mechanisms of the screw-and-nut type which thus make it possible to vary progressively the position of the upper fastening point of the pectoral strand.

Other embodiments make use of pawls and holes, in relation to which movable-carriage mechanisms are shifted.

Other embodiments employ mechanisms having a bolt equipped with a latch and a keeper.

It will therefore be appreciated that all these devices are complicated and are therefore unreliable and of relatively high cost.

The invention proposes to provide a retention mechanism for a safety-belt band of manually adjustable position, which is intended to be fastened to a structure and does not have this type of disadvantage and which is relatively simple and of relatively modest production and installation costs.

The subject of the invention is a retention mechanism for a safety-belt band of manually adjustable position, intended to be fastened to a structure and consisting of, among other things, a body with a base pierced with a slot and of mounts for anchoring to the structure and of a band support with a reinforcement and an aperture, and which is associated with the body and is movable relative to the latter. This mechanism is notable in that the base and the anchoring mounts of the body are arranged so as to form a recess at the rear of the base, and in that it possesses a guide in line with the recess and equipped with at least two cells, with each of which a stay is associated, and at least one spring generating a force in line with each cell and in the direction of the latter, and in that the band support is associated with the body in such a way that its aperture has the base and the guide passing through it, and in such a way that its reinforcement can engage into a cell and rest against a stay or travel in the recess, the force generated by the spring normally laying the reinforcement into the cell.

Other characteristics of the invention will emerge from a reading of the following description and claims and from an examination of the accompanying drawing which is given purely by way of example and in which:

FIG. 1 is a front view of an embodiment of the invention.

FIG. 2 is a longitudinal section through FIG. 1;

FIG. 3 is a view, similar to that of FIG. 1, of an alternative embodiment of the invention; and FIG. 4 is a longitudinal section through FIG. 3.

Since safety-belts and the arrangements intended for fitting them, especially safety belts for motor vehicles, are well known in the art, the following description will be limited to what relates directly and indirectly to the invention. For the rest, the specialist in the technical sector under consideration can draw from the conventional solutions at his disposal in order to deal with the particular problems which he has to solve.

The same reference numerals are used hereafter to designate similar parts with corresponding functions, whatever the embodiment.

Thus can be seen by examining the various Figures of the drawing, associated with a vehicle structure or shell 10 is a retention mechanism for a safety-belt band of manually adjustable position according to the invention. This mechanism comprises, among other things, a body 20, a guide 30, a spring 40, a band support 50 and, if appropriate, a cover 70.

The mechanism according to the invention is intended particularly to be fastened to a structure or shell 10 of a motor vehicle, more particularly to the central pillar or middle foot which is located between the front and rear side doors of a four-wheel vehicle. This structure 10 is equipped, for example, with an orifice 11 and with a hole 12, the functions of which will be dealt with later.

The body 20 which is preferably stirrup-shaped comprises a base 21 and anchoring mounts 22. Each anchoring mount is composed of a branch 221 virtually perpendicular to the base 21 and terminates on the same side as its free end in a rim 222, as illustrated. If appropriate, this body is also equipped with flanks 23 preferably directed towards the mounts. The body 20, by virtue of its shape, forms a recess 211 at the rear of the base 21.

The guide 30 arranged in line with the recess 211 is equipped with at least two cells 312, with each of which at least one stay 313 is associated.

The mechanism also possesses a spring 40, which consists for example, of a web 41 and of blades 42 and which is shaped so as to have wings 411 for fastening it by means of rivets 413 which retain it on the guide.

The shape of the spring 40 is such that the blades 42 generate a force in line with each cell 312 and in the direction of these, as emerges clearly from FIGS. 2 and 4 in particular.

Instead of using a single spring, suitable separate independent springs can be employed.

The band support 50 is composed of a frame 51 equipped with a reinforcement 53 and pierced with a band passage 54 and with an aperture 55, as can be seen clearly in the figures of the drawing. The reinforcement 53 takes the form, for example, of a rod 531 with multiple elbows, one portion of which is visible. A band (not shown) passes freely through the passage 54 where it can travel.

Reference will now be made more especially to FIGS. 1 and 2 which illustrate a particular embodiment of the invention.

First can be seen, the guide 30 is composed of an element in the form of a bar 31 terminating in stanchions 32. The face of the bar 31 which is opposite the body 20 forms a clearance 311 where the cells 312 equipped with stays 313 are located.

All the components of the mechanism according to the invention are assembled so as to have the configuration illustrated clearly in the figures.

As can be seen, the guide 30 and the body 20 pass through the aperture 55 of the band support 50, and the rod 531 of the reinforcement of the latter is engaged into one of the cells 312, where it is retained as a result of the force generated by the spring fastened to the guide by means of the rivets 413.

The mechanism assembled in this way is secured to the structure. For this purpose, a rim 222 is engaged into the appropriate orifice 11 of the structure or shell 10, and the other rim 222 is fastened to this structure by means of a bolt, not bearing a reference, which passes through the hole 12 and a corresponding hole, also not bearing a reference, in the rim, as illustrated by way of example.

For aesthetic reasons, if appropriate the mechanism is covered with a suitable cover 70, as in the alternative embodiment illustrated in the FIGS. 3 and 4.

As can be seen in the Figures, the stays 313 of the cells 312 are curved in such a way that the rod 531 of the band support can tilt in at least one direction in relation to the body for the sake of passenger comfort.

This embodiment of the mechanism according to the invention is used as follows:

It is assumed that it is in the initial state, as shown in FIGS. 1 and 2. If the user wishes to change the position of the band support 50, it is then sufficient for him to grasp this, push it back towards the shell or structure 10 counter to the force generated by the spring 40, in order to release the rod 531 from the cell 312, and then slide the latter along in the clearance 311 of the rear of the bar 31 of the guide 30. By sliding the band support thus released, it is possible to make it reach the other cell of the opposite end of the guide, where the rod engages after pushing back the blade of the spring.

If appropriate, other cells can be provided along the bar 31 of the guide 30 in order to obtain intermediate adjustment positions.

The great simplicity and advantages arising from the mechanism according to the invention will thus be appreciated.

Reference will now be made to FIGS. 3 and 4 which illustrate an alternative embodiment of the invention. The description will therefore be limited to what distinguishes it from the alternative embodiment described above.

As can be seen, the essential feature is the shape of the guide 30. In this embodiment, instead of using a separate element, the flanks 23 of the body 20 are employed directly in order to obtain the guide. The notches 231 are cut out in the flanks themselves, and lugs 232 obtained in this way are bent and curved so as to serve also as stays 313. Likewise, the flanks 23 are recessed between the notches, so as to provide the clearance 311 necessary for the travel of the reinforcement between these various possible positions. Here too, in this embodiment, only two notches are illustrated, but it is clear that intermediate notches can be provided so as to have more than two positions of manual adjustment.

Otherwise, the way in which this mechanism is assembled and secured to the structure and its mode of operation are identical to those of the preceding example.

This embodiment is equipped with a suitable embellishing cover 70 of appropriate design. The body 20 is preferably metallic and the band support produced by moulding a synthetic material, in which the preferably metallic reinforcement 53 is embedded. The cover 70 is produced, for example, from synthetic material, as is customary.

The foregoing illustrates clearly the advantages afforded by the mechanism according to the invention because of its very great simplicity in terms of its structure, its assembly and its method of use.

We claim:

1. Retention mechanism for a safety-belt band of manually adjustable position, adapted to be fastened to a part of a vehicle structure (10) and consisting of: a body (20) with a base (21) and mounts (22) for anchoring the base to the structure (10); a band support (50) having a reinforcement (53) which partial defines an aperture (55) and which is movably connected to the body to adjust the position of the safety belt band; wherein the base (21) and the anchoring mounts (22) of the body (20) are arranged so as to form a recess (211) of the rear of the base, the body further including a guide (30) in line with the recess (211) and equipped with at least two cells (312), with each of which a stay (313) is associated; and at least one spring (40) generating a force in line with each cell (312) and in the direction of the latter; wherein the the band support (50) is movably connected to the body (20) in such a way that its aperture (55) has the base (21) and the guide (30) passing through it, and in such a way that the reinforcement (53) can engage into a cell (312) and rest against a stay (313) or travel in the recess (212), the force generated by the spring (50) normally pushing the reinforcement (53) into a cell (312).

2. A mechanism according to claim 1, wherein the guide (30) comprises an element in the form of a bar (31) terminating in stanchions (32) and is seated in the recess (211) and of which the face opposite the base (21) is provided with a clearance (311) and carries the cells (312) with their stays (313) in order to receive the reinforcement (53) of the band support (50).

3. A mechanism according to claim 1, wherein the body (20) possesses lateral flanks (23) between the mounts (22), and the guide (30) consists of clearances (311) made in the flanks (23) and of notches (231) made in the latter in order to form the cells (312).

4. A mechanism according to claim 3, wherein the notches (231) are edged with lugs (232) bent to form the stays (313).

5. A mechanism according to claim 1, wherein the stays (313) are curved to allow the transverse tilting of the band support (50) in at least one direction in relation to the body (20).

6. A mechanism according to claim 1, wherein the spring (40) has a web (41) with two blades (42) acting in line with the cells (312) and with two wings (411) for fastening to the guide (30).

7. A mechanism according to claim 1, wherein the reinforcement (53) comprises a rod (531) with multiple elbows.

8. A mechanism according to claim 1, wherein the body (20) has the shape of a stirrup where each anchoring mount (22) has a branch (221) perpendicular to the base and terminating in a rim (222).

9. A mechanism according to claim 1, wherein the band support (50) includes a passage (54) which a band can pass through freely and in which the latter can travel.

* * * * *